United States Patent [19]

Rosa et al.

[11] 4,433,595

[45] Feb. 28, 1984

[54] PRECISION ROTOR INDEXING DEVICE

[75] Inventors: Hugh E. Rosa, Schenectady; Allen A. Slaterpryce, Scotia, both of N.Y.

[73] Assignee: General Electric Company, Schenectady, N.Y.

[21] Appl. No.: 307,030

[22] Filed: Sep. 30, 1981

[51] Int. Cl.³ .......................................... B23Q 17/00
[52] U.S. Cl. ................................................ 74/813 L
[58] Field of Search ............. 74/738, 163, 164, 813 C, 74/813 L, 813 R, 816, 817

[56] References Cited

U.S. PATENT DOCUMENTS

| | | | |
|---|---|---|---|
| 1,446,424 | 2/1923 | Kutcher | 74/164 |
| 2,269,835 | 1/1942 | Wallace et al. | 254/93 |
| 3,097,485 | 7/1963 | Bidwell | 60/39.14 |
| 3,466,936 | 9/1969 | Gaupin | 74/83 |
| 3,550,477 | 12/1970 | Kinnicutt, Jr. | 74/817 |
| 4,018,094 | 4/1977 | Schmidt | 74/128 |
| 4,090,409 | 5/1978 | Ohleyer | 74/128 |

FOREIGN PATENT DOCUMENTS 96814 8/1958 Norway .
1144963 3/1969 United Kingdom .................. 74/138

Primary Examiner—Leslie A. Braun
Assistant Examiner—Anthony W. Raskob, Jr.
Attorney, Agent, or Firm—J. C. Squillaro

[57] ABSTRACT

A method and apparatus for providing precisely controlled micro-indexing of rotational elements utilizes a bidirectionally controllable linear force actuator in combination with a self-locking linkage mechanism to frictionally grip and to impart a pure turning moment to the rotational element. The method and apparatus disclosed are especially advantageous for use with large rotational elements, such as the rotors of gas turbines. The indexing method inserts a minimal amount of stored energy into a system thereby virtually eliminating overshoot. In a preferred embodiment comprised of a pair of symmetrical indexing sections, the desired micro-indexing is accomplished while imposing no additional loading on the rotational element.

9 Claims, 2 Drawing Figures

PRECISION ROTOR INDEXING DEVICE

BACKGROUND OF THE INVENTION

The present invention relates generally to indexing devices for precisely controlling small incremental rotation of rotational elements, and in particular to a linear force actuated indexing device for providing micro positioning of large cylindrical loads, such as the rotor of a gas turbine or similar machine. Specifically, the invention discloses a method and apparatus for performing the desired micro-indexing rotation wherein hydraulically actuated cylinders in unique combination with self-locking compound linkage elements impart the required clamping friction and pure turning moment to the element being rotated.

DESCRIPTION OF THE PRIOR ART

Apparatus and methods for affecting small rotations of rotational elements are, of course, as well known as the rotational elements themselves. Over the years, as number of techniques have been employed in efforts to provide controllable indexing of rotational elements, and have been more or less successful in achieving some of the desired end results. Generally, early prior art approaches for providing desired incremental rotation using simple mechanical devices for providing controllable rotational angles are accompanied by a measure of angular overshoot, and have done so while introducing somewhat tolerable loading forces on the rotational elements involved. Later prior art approaches have successfully incorporated hydraulically actuated elements (and other types) into indexing devices.

A representative early prior art device used for spotting (slowing rotating to a desired angle) an internal combustion engine is disclosed in U.S. Pat. No. 2,269,835 (1942) to Wallace et al. Therein, a manually pumped pneumatic cylinder is used to thrust a jackhead jaw into notches on the engine flywheel to impart increments of rotation. A somewhat later (1973) indexing mechanism using a series of hydraulic cylinders in combination with rack/spur gears for rotating a shaft is disclosed in U.S. Pat. No. 3,762,242 to Swezey.

The use of hydraulic cylinders for providing indexing or rotary drives to rotational elements is also disclosed in U.S. Pat. No. 3,446,936 to Gaupin, and U.S. Pat. No. 3,550,477 to Kinnicutt, Jr. The Kinnicutt patent discloses a two-hydraulic cylinder/connecting linkage arrangement for indexing heavily loaded shafts in either direction, but does not include the use of friction bands to engage the rotational elements. The Gaupin patent discloses a system wherein a pair of hydraulic cylinders are sequentially actuated to first frictionally grip, and subsequently to slowly rotate a large drum.

Prior art devices have generally failed to overcome the substantial problems encountered when attempting to micro-index massive rotational elements as are found in modern large gas turbine/generator machines.

With the combustion of a wide range of residual and crude oil fuels in gas turbines which tend to cause erosion and corrosion of the hot gas path components of a gas turbine, it is important that critical interior portions of these machines are capable of being minutely inspected. Micro-indexing devices required for such precision uses have not previously been available. Pre-existing methods for providing gas turbine indexing are incapable of the required resolution and precision necessary to adequately perform visual and metallurgical inspections of gas turbine rotating components. Additionally, due to the needs for obtaining the maximum degree of operating efficiency from existing and future turbine/generator machine, it is important that parasitic auxiliary apparatus not be permanently built into these machines in order to accomplish the periodically needed inspection and maintenance functions.

SUMMARY OF THE INVENTION

It is therefore a primary object of the present invention to provide an improved method and apparatus for precisely indexing rotational elements.

Another object of the present invention is to provide an improved method for precisely indexing a rotational element by applying virtually pure turning moment to the element, and for eliminating undesired angular overshoot in the indexing process.

A further object of the present invention is to provide improved apparatus for precisely controlling incremental rotation of rotational elements utilizing an actuator mechanism to both frictionally grip, and to apply pure turning moment to the rotational element.

A still further object of the present invention is to provide improved micro-indexing of gas turbine rotors (and similar large rotating machine elements) to facilitate visual and metallurgical inspections of the rotating machine components.

A yet further object of the present invention is to provide an improved apparatus for attachment to a large rotational element without the need to dismantle or disassemble the rotational element, which utilizes a bidirectionally controllable linear force means to both frictionally grip and to impart the desired rotation to the rotational element via a single smooth action.

In one embodiment of the present invention, a simple, completely portable, and easily installable indexing device is disclosed which provides precisely controllable micro-indexing of large rotational elements in either direction. The indexing disclosed is highly advantageous in that it provides the desired indexing without the usual overshoot and shaft loading problems, and the apparatus accomplishes the desired purposes using bidirectionally controllable linear force actuators in combination with a sefl-locking linkage mechanism to frictionally grip and to impart pure turning moment to the element to which it is attached.

BRIEF DESCRIPTION OF THE DRAWINGS

Additional objects and advantages of the invention will become apparent to those skilled in the art as the description proceeds with reference to the accompanying drawings wherein.

DETAILED DESCRIPTION OF THE PREFERRED EMBODIMENT

Figure 1:
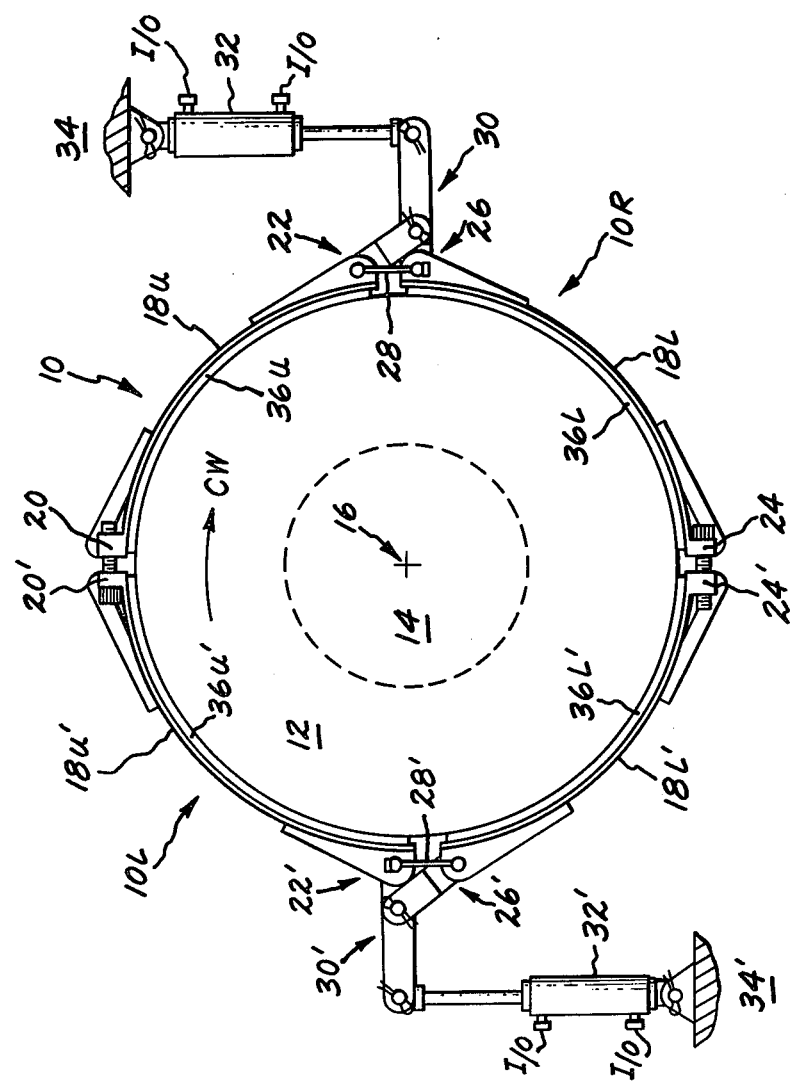
FIG. 1 is a schematic side elevation of a preferred embodiment of the precision rotor indexing device according to the present invention.

FIG. 1 is a schematic side elevation of a preferred embodiment of the precision indexing device according to the present invention. A hydraulically actuated precision indexing device shown generally as 10 is depicted as being comprised of two symmetrical sections designated generally as 10R and 10L, arranged around a cylindrical rotor member 12. The rotor member 12 may be the load coupling flange on a gas turbine/generator pair, of any other suitable element for rigidly coupling to the rotor shaft of a rotating machine having a substantial rotary moment of inertia. The rotor member 12 is carried by a rotor shaft 14, both of which rotate in normal use in the CW direction (illustratively) around a longitudinal axis 16.

The right section 10R of the indexing device 10 is shown as having a semicircular outer flat band formed of an upper quarter section 18U and a lower quarter section 18L. The upper quarter section 18U is terminated with connecting flanges 20 and 22. The lower quarter section 18L is similarly terminated with connecting flanges 24 and 26. The upper and lower band sections 18U and 18L are flexibly joined near the center point of their symmetrical shape by a retaining bolt 28, and are further jointed by a compound self-locking linkage assembly 30, both of which interconnect the flanges 22 and 26. The linkage assembly 30 is articulated by a linear force actuator, shown here as a hydraulic cylinder 32 which is anchored to a stationary support surface 34. The hydraulic cylinder 32 is of the type which is differentially energized to controllably provide piston displacement in either direction. The hydraulic cylinder 32 may be energized in either sense by the controlled input of pressurized oil via the inlet/outlet ports I/O using conventional hydraulic power supplies (not shown). A layer of friction strip material 36U and 36L, is affixed to the inner surfaces of the semicircular band sections 18U and 18L in upper and lower sections 36U and 36L, and bears smoothly on the outer circumference of the rotor member 12.

The left section 10L contains substantially the same components as detailed with respect to the right section 10R, the two sections being symmetrically configured and assembled to form a unitary circular composite device. The composite device having the four circumferential discontinuities described, are joined together by junctions at the discontinuities. The individual elements of the left section 10L are numbered similarly to the corresponding elements of the right section 10R. The numbers of the left section are designated by a prime superscript (e.g. 22-22'), it being understood that the left section elements are symmetrically equivalent in both structure and function to those described in connection with the right section 10R. Where it is not necessary to distinguish between the corresponding elements in a left/right sense, the numbers without the prime superscript will be referred to as representing both elements.

By way of a brief overview, the circular composite precision indexing device 10 imparts a controllable rotation to the gas turbine rotor member 12 via a combined friction clamping/torsional action achieved by the interaction of the elements. Controllably extending the hydraulic cylinders 32 serves first to actuate the linkage assemblies 30 thereby tightening the band sections and urging the friction strips against the rotor surface; and second to lock the linkage assemblies 30 to translate the subsequent extension into a pure turning moment which is transferred to the rotor element. The controlled clamping force exerted by the band sections causes translation of the linear force exerted by the hydraulic cylinder into pure turning moment at the rotor, plus the self-locking action of the linkage assembly and inherent minimal total energy stored in the device, all contribute to assure precise rotor micropositioning without the overshoot and other problems common on the conventional rotational devices. When the present method and apparatus is employed to precisely index large gas turbine rotors for minute inspection purposes, it becomes possible for the first time to provide complete examination of the total bucket surface areas.

Figure 2:
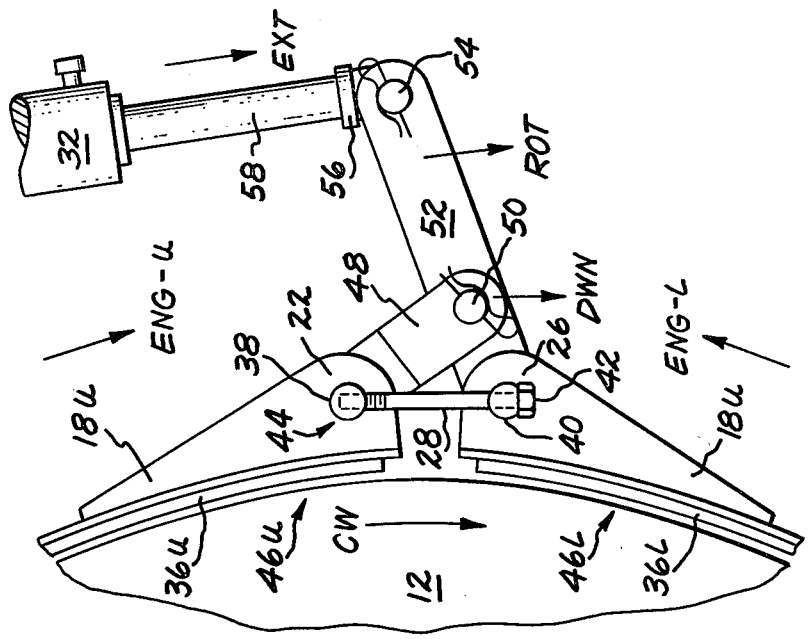
FIG. 2 is a schematic side elevation of a self-locking linkage assembly used in the rotor indexing device.

Turning now to FIG. 2, there is shown a schematic side elevation of the compound self-locking linkage assembly 30 in greater detail. The linkage assembly 30 is shown as mating with connecting flanges 22 and 26, the end terminations for band sections 18U and 18L respectively. To the band sections 18U and 18L are affixed the strips of friction material 36U and 36L, all of which are concentrically positioned around the periphery of the rotor member 12. A pair of cylindrical pivot pins 38 and 40 are fitted respectively into flanges 22 and 26, and are machined to accept a threaded retaining bolt 28 having a bolt head 42. The end of the bolt 28 is inserted through a slightly oversized mating cylindrical hole in the pivot pin 40, and its threaded end is rigidly fixed to the pivot pin 38 by being threadedly inserted as shown in the area 44. The bolt 28 thus serves as a compensator link by allowing the upper and lower band sections 18U and 18L to approach each other circumferentially, but precluding their separation by more than a fixed, predetermined amount. Thus in the quiescent or "rest" position, the linkage assembly 30 causes the upper and lower band sections 18U and 18L to carry the friction strip material 36U and 36L slightly displaced from the outer circumference of the rotor 12. This slight clearance is shown as the gaps 46U and 46L.

The linkage assembly 30 further has an intermediate link 48 coupled at a first end to the pivot pin 38, and coupled at a second end via a pivot pin 50 to a pivot link 52. The pivot link 52 is coupled at a first end to the pivot pin 40, and at a second end via a pivot pin 54 to a cap 56. The cap 56 is in turn rigidly carried by the end of an extendible piston 58 associated with the hydraulic cylinder 32. The interaction of the pivot link 52 with the intermediate link 48, as reflected in the forces transmitted to the upper and lower bands 18U and 18L via the various pivot pins, is such as to produce a number of unique and useful attributes for micropositioning of the large rotational elements under consideration. Among these attributes are a self-locking action of the linkage assembly 30 wherein the tension imparted to the upper and lower bands 18U and 18L is always proportional to the force required to affect rotation of the rotor member 12; and the conversion of a linear force developed by the hydraulic cylinder 32 into pure moment applied to the periphery of the rotor, thereby imposing no additional extraneous loading on the rotor member 12. These attributes, and others, will be described with reference to both FIGS. 1 and 2. It should be noted that both figures have been drawn in somewhat simplified form and further that the various elements are not drawn to scale—both to increase the clarity of exposition. As a consequence of this, and particularly with respect to FIG. 2, the link elements not being to scale leads to the relative angles depicted by the various relative motion arrows being merely approximations.

The overall device configuration implied by the particular linkage assembly 30 of FIG. 2 is one which will cause the rotor member 12 to be indexed in the clockwise direction, as shown by the "CW" arrow. The condition actually shown in FIG. 2 is the quiescent one wherein the rotor member 12 is unengaged by the indexing apparatus, and the various components may be considered as being in a "rest" position. To affect an incremental CW rotation, the hydraulic cylinder 32 is energized causing piston 58 to extend in the direction shown (downward) by the arrow "EXT". (The present description is detailed with respect to the right half of the indexing device elements. Obviously, both halves of the system are being affected in a symmetrical manner.) This motion causes the pivot link 52 to rotate in the direction shown (clockwise) by the arrow "ROT" around the pivot pin 40, simultaneously urging the lower band section 18L upward through the pivot pin 40, and intermediate link 48 downward through the pivot pin 50. The upward motion of the lower band 18L begins to compress the overall indexing device around the rotor 12, thereby initiating engagement of the rotor member 12 by the friction strip material 36L, as indicated by the motion arrow "ENG-L" for the lower band 18L. Similarly, the downward motion of the link 48 begins to exert a downward force on the upper band 18U to the pivot pin 38, as indicated by the motion arrow "DWN" for the link 48. The action of link 48 in urging the upper band section 18U downward, further contributes to the rotor engaging action by the frictional strip material 36U, as indicated by the motion arrow "ENG-U" for the upper band section 18U. The amount of linear extension of the piston 58 is, of course, established by the conventional hydraulic control means used to energize the hydraulic cylinder 32. And, also as is well known, precisely controlled and minute amounts of piston extensions are readily achievable. The hydraulic control means are actuated by an operator who determines the degree of rotation desired and energizes the hydraulic cylinder 32 accordingly.

On further extension of the piston 58, the relative motion actions detailed above are continued until the displacement gaps 46U and 46L are substantially closed and the frictional grip of the strip material on the rotor member 12 becomes sufficient to overcome the static friction of the rotational elements of the machine. At that point, the linkage assembly 30 begins the lock up as the allowable relative motion between the various link elements greatly decreases. The linkage assembly 30 thereafter becomes a rigid whole and serves to transfer any subsequent extension of the piston 58 into pure tangential force applied to the outer periphery of the rotor member 12. One of the major advantages of the present invention in the illustrative configuration shown becomes clear at this point—namely, that the minute and precisely controllable displacements of a linear force actuator are directly converted into torque with a very minimal amount of total energy storage in the elements of the indexing device. A direct consequence of the precisely controllable minute linear displacements obtainable is that the rotor member 12 can be rotated by small amounts under positive control, which is no small feat for rotational elements of large moments of inertia. And, a direct consequence of the low amount of energy storage and the locking action of the linkage assembly 30 of the indexing device is that the micro-indexing can be achieved without overshoot. Basically, the multi-mode action of the linkage assembly 30 first engages the rotor member 12; subsequently locks in a fixed arrangement; and ultimately applies torque directly to the rotor member 12 while remaining locked. Due to the symmetrical action of the right and left sections 10R and 10L, a substantially pure turning moment is achieved, and the micro-indexing is accomplished with little or no extraneous forces applied to the rotor member 12. In the absence of further extension of piston 58, the system including the index device 10 and the rotor 12 become immobile. In this state, any potential overshoot of the rotor 12 is inhibited due to the resistance of the piston 58 to displacement in either direction due to reactions from the external load.

To produce a succession of small angles of rotation, or a relatively large angle of rotation of the rotor 12, the sequence detailed above is performed repetitively. For either case, the action is substantially as follows. When the linear displacement of the piston 58 has reached a practical limit, and the resulting indexing of the rotor 12 has reached a corresponding angular limit, the control to the hydraulic cylinder 32 is reversed causing the piston 58 to retrace its motion. The broad steps outlined above are then repeated in inverse order. That is, the indexing device ceases CW rotation of the rotor; the linkage assembly 30 unlocks; the various elements of the linkage assembly 30 move in directions opposite to those detailed above; the friction strips disengage from the rotor; and the indexing device again resumes its quiescent or rest state as illustrated in FIG. 2. The micro-indexing action is then reinitiated as detailed above, to bring the rotor 12 to any desired rotational angle.

Referring now to FIG. 1 only, additional aspects of the present invention will be described. As is well known, the rotors of large gas turbines and similar machinery having massive rotational members, are not susceptible to being moved into convenient locations for inspection and maintenance purposes. Therefore, auxiliary devices for use with these machines must be amenable to engaging suitable rotational members on a where-is and as-is basis. To this end, the present embodiment of the indexing device 10 has been divided into two sections with a clam-shell-like configuration. The two semi-circular sections 10R and 10L are shown as being symmetrically arranged, but that restriction need not necessarily apply as is discussed below. However, the two-section arrangement mated together at the circumferential discontinuities by the connecting flanges 20/20' and 24/24' permits the indexing device 10 to be installed on large rotational elements having only a modest degree of access to both front and rear sides of the machine. In those instances, the indexing device 10 is disassembled at the flanges 20 and 24; the two sections are individually emplaced around the appropriate rotational member; and the two sections are then reunited for normal usage.

An additional benefit which flows from the two-section configuration is the capability of providing either direction of indexing of the rotor 12 dependent merely on the sense of the assembly of the device. Thus, if it is necessary or desirable that maintenance or inspection be accomplished employing a particular direction of rotation of a large machine, the indexing device 10 is installed so as to accommodate the preferential machine direction of rotation. With reference to FIG. 1, if it were desirable to index the rotor 12 in a counterclockwise (CCW) direction, the right and left sections 10R and 10L are installed 180° inverted to the orientations shown. This would result in the right section 10R being repositioned such that the hydraulic cylinder 32 would be located in the lower right corner of the machine (as seen looking into the page along the longitudinal axis 16), and the left section 10L being repositioned such that the hydraulic cylinder 32' would be located in the upper left corner of the machine. Aside from the reversed direction of indexing, all other aspects of the invention would function indentically as previously described. Additionally, as the hydraulic power of the indexing device 10 is totally independent from the rotating machine to which it is attached, maintenance and testing of the machine can be done independently of its operational status.

Although the invention has been described in terms of a preferred embodiment, the invention should not be deemed limited thereto since other embodiments and modifications will readily occur to those skilled in the art. It is therefore to be understood that the appended claims are intended to cover all such modifications as fall within the true spirit and scope of the invention.

What is claimed is:

1. Apparatus for indexing a rotor member of the type having a cylindrical surface, comprising:
   a metallic circular band fittable to encircle said cylindrical surface;
   first and second discontinuities spaced 180 degrees apart in said circular band;
   first and second attachment points at extremities of said circular band at said first discontinuity;
   third and fourth attachment points at extremities of said circular band at said second discontinuity;
   a first self-locking compound linkage assembly joining said first and second attachment points;
   a second self-locking compound linkage assembly joining said third and fourth attachment points;
   said first self-locking compound linkage assembly including first means for locking said circular band to said rotor member in response to a first force applied in a first tangential direction to said first self-locking compound linkage assembly and for releasing said circular band in response to a second force applied thereto in a second tangential direction;
   said second self-locking compound linkage assembly including second means for locking said circular band to said rotor member in response to said first force applied in said first tangential direction to said second self-locking compound linkage assembly and for releasing said circular band in response to said second force applied thereto in said second tangential direction;
   a first linear actuator effective to apply a selected one of said first and second forces to said first self-locking compound linkage assembly;
   a second linear actuator effective to apply a same one of said first and second forces to said second self-locking compound linkage assembly whereby said cylindrical surface receives substantially equal tangential forces spaced 180 degrees apart for imparting pure rotating moment to said rotor member;
   each said self-locking compound linkage assembly comprising two links pivotally secured to each other, a first one of said links being pivotally secured to one of said first or third attachment points and a second of said links being pivotally secured to one of said second or fourth attachment points, each of said linear actuators being pivotally secured to a respective one of said links; and
   said first and second linear actuators being further effective, when said first force is applied to said first and second self-locking compound linkage assemblies thereby locking said circular band to said cylindrical surface, to continue substantially linear motion whereby a controlled unidirectional rotation of said rotor member is produced.

2. The apparatus of claim 1 wherein said first and second linear actuators each include a hydraulic cylinder having an extendable piston.

3. The apparatus of claim 1 wherein said circular band includes at least two approximately quarter-circular sections interconnected by a detachably rigid junction.

4. The apparatus of claim 3 wherein said first and second means for locking includes a layer of frictional material affixed to an inner surface of said quarter-circular sections, said layer being discontinuous in the vicinity of said first and second discontinuities and said rigid junction.

5. The apparatus according to claim 3 wherein said detachably rigid junction includes means for opening said circular band for temporary installation about said cylindrical surface.

6. The apparatus according to claim 5 wherein said means for opening includes means for installation of said apparatus in a sense effective for selectably providing motion of said rotor member in either of said first and second directions in response to application of said first and second forces respectively.

7. A method of precisely indexing a gas turbine rotor having a rotational element with a circular outer surface rigidly coupled in torsion to said rotor and a circular band having at least first and second circumferential discontinuities spaced 180 degrees apart therein around said circular outer surface, said method comprising the steps of:
   (a) selectively applying frictional and torsional forces to said rotational element at said first and second discontinuities;
   (b) providing first and second compound linkage assemblies, each having a quiescent position, a transitional position and a locked position at said first and second discontinuities, to flexibly retain said circular band and to controllably adjust a circumferential spacing at said first and second discontinuities in response to an externally applied linear displacement;
   (c) applying first and second linear displacements in a first tangential direction to said first and second compound linkage assemblies to frictionally engage said rotational element as a result of said first and second compound linkage assemblies being moved to their transitional position and to apply a substantially torsional indexing force to said rotational element as a result of said first and second compound linkage assemblies being moved to their locked position and;
   (d) continuing said first and second linear displacements displacement with said first and second compound self-locking linkage assemblies maintained in their locked positions by said displacements whereby a controlled rotation of said gas turbine rotor is attained by a rotational movement of said circular band.

8. The method of claim 7 further comprising the steps of:
   (e) applying a second linear displacement in a second tangential direction opposite to said first direction to move said compound linkage assembly out of the locked position thereby removing said torsional force and moving said compound linkage assembly into the quiescent position thereby releasing said frictional engagement; and (f) repeating steps (a) through (e) above in a controlled manner to thereby effect a precise indexing of said gas turbine rotor to any desired rotational angle.

9. The method of claim 7 including the further step of applying said linear displacement in a fixed amount and retaining that fixed displacement amount by control of said first and second linear force actuators thereby retaining said linkage in the locked position and preventing overshoot by a controlled rigidity of said linear force actuator.

* * * * *